United States Patent Office 3,449,066
Patented June 10, 1969

---

3,449,066
RECOVERY OF MOLYBDENUM VALUES FROM AQUEOUS SOLUTIONS USING α-HYDROXY OXIMES
Ronald R. Swanson, New Hope, Minn., assignor to General Mills, Inc., a corporation of Delaware
No Drawing. Filed Dec. 26, 1967, Ser. No. 693,060
Int. Cl. C01g 39/00
U.S. Cl. 23—22                                            12 Claims

---

ABSTRACT OF THE DISCLOSURE

Molybdenum values are recovered from aqueous solutions by contacting such solutions with a liquid organic phase containing an α-hydroxy oxime of the idealized formula

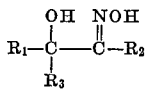

where $R_1$, $R_2$ and $R_3$ are alkyl groups of 1 to about 14 carbon atoms, $R_1$ and $R_3$ are attached to the hydroxyl substituted carbon atom through primary carbon atoms and the oxime contains a total of 8 to about 44 carbon atoms. The molybdenum values can be stripped from the organic phase by aqueous basic stripping solutions and then recovered from such stripping solutions.

---

The present invention relates to the recovery of molybdenum values from aqueous solutions thereof and in particular to a liquid-liquid ion exchange extraction process employing certain α-hydroxy oxime extractants.

A considerable effort has been made to recover molybdenum values from aqueous solutions containing same. Much of this work has been carried out with organic solvent solutions of various amines and quaternary ammonium compounds. While these materials do bring about the transfer of the molybdenum values from the aqueous to the organic phase, they do not yield processes completely free of difficulties. The main problem encountered is that such reagents do not load molybdenum to a very high concentration before precipitation or third phase formation occurs. Such precipitate causes difficulties in pumping, filtration and in stripping or recovering of the molybdenum values from the extractant.

I have now discovered that certain α-hydroxy oximes are excellent extractants for molybdenum values. The α-hydroxy oximes used in the process of the present invention have the following idealized structural formula:

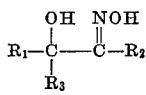

where $R_1$, $R_2$, and $R_3$ are straight or branched chain alkyl groups of 1 to about 14 carbon atoms with $R_1$ and $R_3$ being attached to the carbon atom substituted with the hydroxyl group through primary carbon atoms, said oximes being further characterized as having a total carbon atom content of 8 to about 44. It is preferred that $R_2$ and either $R_1$ or $R_3$ are the same and also that the oxime has a total carbon atom content of about 12 to 20. When dissolved in an organic solvent according to the present process, these α-hydroxy oximes load molybdenum to a high concentration with no evidence of precipitation or third phase formation. No additives are required to inhibit precipitate formation and no special "bleed stream," oxidation or reduction procedures are required. Additionally the α-hydroxy oximes have good oxidative and hydrolytic stability and thus can be continuously recycled after the molybdenum values are stripped from the organic phase.

The α-hydroxy oximes used in the present invention are prepared by reacting the corresponding acyloins with a hydroxyl amine salt under reflux conditions. Such reaction can be carried out by refluxing the reactants in an alcohol, such as methanol, ethanol and the like. A weak base must be present to react with the acid part of the hydroxylamine salt. Sodium acetate or pyridine are preferred weak bases.

The starting acyloins are also prepared by well-known procedures. Thus an ester is dissolved in a suitable solvent such as ether or toluene containing sodium metal. This results in a condensation of two moles of the ester with the formation of the sodium salt of the enol form of a hydroxy ketone. An alkyl bromide or iodide is reacted with such salt and then the resulting product is decomposed by the addition of water to yield the acyloin. Relatively pure fractions of the acyloin can be obtained by distillation procedures. It is to be understood, of course, that mixtures of esters can be condensed to yield relatively complex products and that mixtures of two or more alkyl bromides or iodides can be employed in preparing the acyloins. The method of preparing the acyloins is described in J. Org. Chem., vol. 11, pp. 788–94 (1946), which disclosure is incorporated herein by reference.

The preparation of the α-hydroxy oximes is further described by the following examples.

EXAMPLE A

To a 1.5 l. resin flask equipped with a stirrer, temperature controller and an addition funnel was charged 46 gm. (2.0 gm. at.) of sodium metal and 500 ml. of toluene. The apparatus was flushed with nitrogen and heated to 105–10° C. The stirrer was started and 172.3 gm. (1.0 mole) of n-butyl-n-hexanoate was added over a ½ hour period. The mixture was held at 105–10° C. for an additional ½ hour and then cooled to 60° C. over a ½ hour period. To this viscous solution 137.0 gm. (1.0 mole) of n-butyl bromide was added over a 10 minute period and the reaction mixture was held at 60° C. for 24 hours. The resulting product was poured into water, the aqueous layer discarded and the toluene solution washed two times with water, one time with dilute sulfuric acid and three more times with water. The toluene was then stripped from the product by distillation and the residue was fractionally distilled to give 52.6 gms. of 7-n-butyl-7-hydroxydodecan-6-one collected at 150.5–152° C./6.1. mm. Hg.

To 38.5 gm. (0.15 mole) of the ketone was added 20.9 gm. (0.3 mole) of hydroxylamine hydrochloride, 27.1 gm. of sodium acetate and 75 ml. of methanol and the resulting reaction mixture was refluxed at 70–75° C. with stirring for 24 hours. The reaction product was cooled to room temperature, poured into water and extracted with ether. The ether layer was washed five times with water, dried over sodium sulfate and finally stripped of ether to give 38.0 gm. of a water white liquid identified as 7-n-butyl-7-hydroxydodecan-6-oxime having the idealized structural formula:

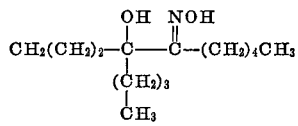

EXAMPLE B

Example A was essentially repeated using 158.2 gm. (1.0 mole) of n-butyl valerate, 46 gm. (2 gm. at.) of sodium, 500 ml. of toluene and 109.0 gm. (1.0 mole) of ethyl bromide. Twenty grams (0.1 mole) of the resulting 6-ethyl-6-hydroxydecan-5-one were then used with 13.9 gm. (0.2 mole) of hydroxylamine hydrochloride, 18 gm. of sodium acetate and 75 ml. of methanol in the preparation of the oxime which was identified as 6-ethyl-6-hydroxydecan-5-oxime having the idealized structural formula:

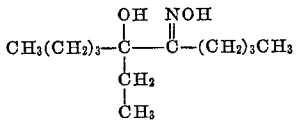

EXAMPLE C

Example A was essentially repeated using 474.7 gm. (3.0 mole) of n-butyl valerate, 138 gm. (6 gm. at.) of sodium, 1600 ml. of toluene and 495.2 gm. (3.0 mole) of n-hexyl bromide. One hundred thirty grams (0.509 mole) of the resulting 6-n-butyl-6-hydroxydodecan-5-one were then used with 70.5 gm. (1.018 mole) of hydroxylamine hydrochloride, 91.9 gm. of sodium acetate and 150 ml. of methanol in the preparation of the oxime which was identified as 6-n-butyl-6-hydroxydodecan-5-oxime having the idealized structural formula:

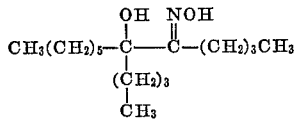

EXAMPLE D

Example A was essentiall repeated using 516.8 gm. (3.0 mole) of n-butyl-n-hexanoate, 138 gm. (6 gm. at.) of sodium, 1500 ml. toluene and 495.2 gm. (3.0 mole) of n-hexyl bromide. One half mole (142.24 gm.) of the resulting 7-n-pentyl-7-hydroxytridecan-6-one was then used with 1.0 mole (69.5 gm.) of hydroxylamine hydrochloride, 90.2 gm. of sodium acetate and 100 ml. of methanol in the preparation of the oxime which was identified as 7-n-pentyl-7-hydroxytridecan-6-oxime having the idealized strutcural formula:

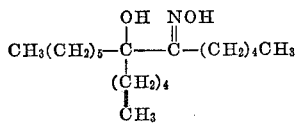

EXAMPLE E

Example A was essentially repeated using 258.4 gm. (1.5 mole) of n-butyl-n-hexanoate, 69 gm. (3.0 gm. at.) of sodium, 750 ml. of toluene and 289.7 gm. (1.5 mole) of 2-ethyl-hexyl bromide. 93.8 gm. (0.3 mole) of the resulting 9-ethyl-7-n-pentyl-7-hydroxytridecan-6-one were then used with 41.7 gm. (0.6 mole) of hydroxylamine hydrochloride, 54.1 gm. of sodium acetate and 100 ml. of methanol in the preparation of the oxime which was identified as 9-ethyl-7-n-pentyl-7-hydroxy-tridecan-6-oxime having the idealized structural formula:

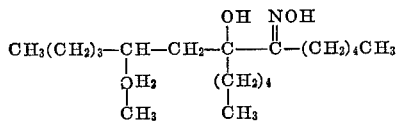

EXAMPLE F

Example A was essentially repeated using 316.5 gm. (2.0 mole) of n-butyl valerate, 92 gm. (4.0 gm. at.) of sodium, 800 ml. of toluene and 302.1 gm. (2.0 mole) of 2-methyl-1-bromobutane. 48.3 gm. (0.212 mole) of the resulting 6 - (2 - methylpropyl) - 6 - hydroxydecan-5-one were then used with 100 gm. (1.43 mole) of hydroxylamine chloride, 129 gm. of sodium acetate and 250 ml. of methanol in the preparation of the oxime which was identified as 6-(2-methylpropyl)-6-hydroxydecan-5-oxime having the idealized structural formula:

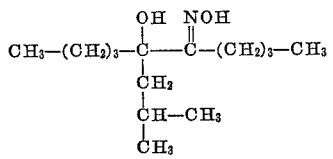

EXAMPLE G

Example A was essentially repeated using 316.5 gm. (2.0 mole) of n-butyl-valerate, 92 gm. (4.0 gm. at.) of sodium, 800 ml. of toluene and 302.1 gm. (2.0 mole) of 2-methyl-1-bromobutane. Seventy grams (0.289 mole) of the resulting 8-methyl-6-n-butyl-6-hydroxydecan - 5 - one were then used with 100 gm. (1.445 mole) of hydroxylamine hydrochloride, 130 gm. of sodium acetate and 250 ml. of methanol in the preparation of the oxime which was identified as 8-methyl-6-n-butyl-6-hydroxydecan-5-oxime having the idealized structural formula:

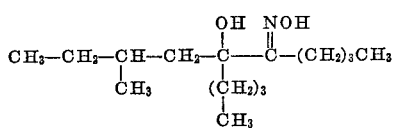

Broadly, the process of the present invention comprises contacting an aqueous solution containing molybdenum values with a liquid organic phase comprising a water-immiscible organic solvent and the α-hydroxy oxime compound wereby at least a portion of the molybdenum values are preferentially extracted into the organic phase. The loaded organic phase is then separated from the aqueous phase by virtue of the immiscibility of the said phases.

The α-hydroxy oxime is dissolved in a water-immiscible organic solvent prior to contacting of same with the molybdenum containing solution. The term "water-immiscible organic solvent" as used herein refers to an organic material normally liquid at ambient temperatures which is substantially, but not necessarily entirely, insoluble in water. The preferred organic solvents for the process of the present invention are the hydrocarbons. Examples of suitable hydrocarbon solvents include isooctane, kerosene, "Soltrol 170" (a commercially available naphthenic hydrocarbon solvent), benzene, toluene, xylene, isodecane, fuel oils, mineral oils, hexane, heptane, octane, "Panasols" (commercially available petroleum aromatic solvents) and the like. Solvents which contain functional groups can also be employed providing that the functional groups do not adversely affect the extraction. Illustrative of such compounds are the alcohols, ketones, and esters such as naturally occurring vegetable oils. Chlorinated hydrocarbons such as carbon tetrachloride are also useful in the present invention.

Generally, the α-hydroxy oxime extractant will be present in the organic phase in an amount sufficient to extract at least a portion of the molybdenum values from the aqueous solutions. Preferably, the oxime will be present in an amount of from about 2 to about 50% by weight based on the total organic phase with an amount of from 2 to 15% by weight being particularly preferred. The α-hydroxy oximes described hereinabove and useful in the process of the present invention are also characterized as having a solubility of at least about 2% by weight in the water-immiscible organic solvent used to make up the organic phase and substantially complete insolubility in water.

The volume phase ratio of the aqueous phase to the organic phase can vary widely depending on the concentrations, conditions, etc. The phase ratio will preferably be in the range of aqueous to organic of about 100:1 to 1:100 and more, preferably in the range of about 10:1 to 1:10. The phase ratio and concentration of the α-hydroxy oxime will, of course, be adjusted so that at least a portion of the molybdenum values are transferred from the aqueous phase to the organic phase during the contacting step. Ideally, all or substantially all of such molybdenum values will be transferred leaving a molybdenum barren aqueous phase. The aqueous and organic phases are preferably agitated during the contacting step. The extraction can be carried out at a wide variety of temperatures—from the freezing point of the aqueous solution to the boiling point and even above where the process is performed under pressure. The phases must, however, remain liquid and ambient temperatures are entirely suitable and preferred.

After the contacting step, the organic and aqueous phases are separated by virtue of their immiscibility, such as by decantation, the use of separatory funnels and the like. The molybdenum values can then preferably be recovered from the loaded organic phase. One preferred method of recovering the said values is to contact the loaded organic phase with an aqueous basic stripping solution. A variety of stripping agents can be used although it is preferred to use aqueous solutions of inorganic bases or basic salts such as for example alkali metal hydroxides, carbonates, ammonia and the like. One preferred stripping solution contains both sodium carbonate and ammonia—i.e. ammonium hydroxide. At least a portion of the molybdenum values are transferred to such stripping solutions and final recovery of molybdenum can be carried out by conventional procedures. For example, the molybdenum can be precipitated as the sulfide by treating the strip solution, after acidification, with sodium sulfide. The molybdenum can also be precipitated as calcium molybdate by treating the strip solution with lime. Treatment of the strip solution with additional amounts of ammonia can also be used to bring about precipitation of ammonia molybdate.

The volume phase ratio of the aqueous stripping solution and the organic phase can also be varied over wide limits. Preferably, the phase ratio of the stripping solution to the loaded organic phase will be in the range of about 100:1 to 1:100 and even more preferably in the range of about 10:1 to 1:10. The aqueous stripping solution and the organic phase are separated by virtue of their immiscibility.

The process of the present invention can be carried out in a continuous manner, especially when an aqueous stripping solution is employed. Thus a stream of the aqueous molybdenum values containing solution can be contacted with a stream of the solution of the α-hydroxy oxime in the water-immiscible organic solvent, the two phases can be continuously separated, the organic phase can be continuously stripped with the aqueous stripping solution, the two phases can be continuously separated, and the stripped organic phase containing the regenerated α-hydroxy oxime can be continuously recycled for contacting further quantities of aqueous solution containing molybdenum values. Fresh aqueous stripping solution can be continuously supplied to the stripping area of the process. Readily available continuous counter-current mixer settler units can be used.

The process of my invention can be used to recover molybdenum values from acidic aqueous solutions obtained from any source. The process has special value for the recovery of such molybdenum values from acid leach liquors of ores containing molybdenum.

The invention is further described by the following examples. Said examples are illustrative only and do not constitute limitations on the invention.

EXAMPLE I

Twenty milliliters of an aqueous solution containing 1.02 g./l. $Mo^{+6}$ (from $Na_2MoO_4 \cdot 2H_2O$) which had been adjusted to pH 1.45 with $H_2SO_4$ and 20 ml. of a 5 wt./vol. percent solution of 7-n-butyl-7-hydroxydodecane-6-oxime in kerosene were combined at ambient room temperature (about 25° C.) in a separatory funnel and shaken for two minutes. The phases were separated and analysis of the aqueous phase showed that it contained only 0.003 g./l. Mo. Therefore, the percent extraction was 99.6.

EXAMPLE II

Various aliquots of an aqueous solution containing 0.818 g./l. $Mo^{+6}$ (from $Na_2MoO_4 \cdot 2H_2O$) adjusted to pH 1.50 with $H_2SO_4$ were placed in separatory funnels. Then various volumes of a 5 wt./vol. per cent solution of 6-n-butyl-6-hydroxydodecane-5-oxime in kerosene were added to the respective separatory funnels and the funnels were shaken at ambient room temperature for 2 minutes to equilibrate the mixtures. The phases were then separated and the aqueous phase from each separatory funnel was analyzed for residual hexavalent molybdenum. The percent extraction was calculated and the results are set forth in the following Table I:

TABLE I

| Extraction No. | Vol. aq. (ml.) | Vol. org. (ml.) | $Mo_6$ aq., g./l. (after extraction) | Percent extraction |
|---|---|---|---|---|
| 1 | 50 | 20 | 0.002 | 99.6 |
| 2 | 50 | 10 | 0.004 | 99.4 |
| 3 | 50 | 5 | 0.071 | 91.4 |
| 4 | 100 | 5 | 0.458 | 56.3 |

The above data show that almost quantitative extraction is obtained at aqueous: organic phase ratios of 2½–5:1 and that over 50% of the molybdenum values are extracted at an aqueous:organic phase ratio of 20:1 at the noted concentration. Ne precipitate or third phase formation was noted in the above examples or those to follow.

EXAMPLE III

Example II was repeated except that 15 ml. aliquots of an aqueous solution containing 10.06 g./l. $Mo^{+6}$ (from $Na_2MoO_4 \cdot 2H_2O$ adjusted to pH 1.50 with $H_2SO_4$ were mixed with equal volumes of water or aqueous acid or salt solutions to alter the pH thereof and then extracted with 10 ml. aliquots of oxime solution as used in Example II. Results are set forth in the following Table II.

TABLE II

| Extraction No. | pH of aqueous adjusted with— | pH | $Mo^{+6}$ aq., g./l. (after extraction) | Percent extraction |
|---|---|---|---|---|
| 1 | $H_2O$ | 1.78 | 3.29 | 34.6 |
| 2 | 0.4 M $H_2SO_4$ | 1.09 | 3.81 | 24.3 |
| 3 | 0.1 M $NaHCO_3$ | 2.70 | 4.05 | 19.5 |
| 4 | 0.066 M $Na_2CO_3$ | 4.50 | 4.05 | 19.5 |
| 5 | 0.25 M $H_2SO_4$ | 0.95 | 2.99 | 40.8 |
| 6 | 2.0 M $H_2SO_4$ | 0.05 | 3.22 | 36.0 |
| 7 | 0.066 M $NaHCO_3$ | 1.92 | 2.99 | 40.5 |
| 8 | 0.033 M $Na_2CO_3$ | 2.20 | 3.68 | 26.9 |
| 9 | 1.33 M $H_2SO_4$ | 0.25 | 3.42 | 32.1 |
| 10 | 0.1 M $Na_2CO_3$ | 5.50 | 4.05 | 19.5 |
| 11 | 0.2 M $Na_2CO_3$ | 7.18 | 5.32 | 00.0 |

The above data show that the extraction must be carried out at a pH below 7.0 At these phase ratios and $Mo^{+6}$ concentrations in the aqueous phase, the organic phase was fully loaded at about the 40% extraction level. Thus if the aqueous phase being extracted contained less molybdenum values or the volume of the organic phase was increased, the percentage of molybdenum extracted into the organic phase would be increased except where the pH of the aqueous phase was above 7.0.

EXAMPLE IV

A 500 ml. aliquot of the molybdenum containing aqueous solution as used in Example II was combined in a separatory funnel with 50 ml. of the oxime solution as also used in said example and shaken for two minutes at ambient room temperature. Analysis of the resulting separated aqueous phase showed that it contained 0.124 g./l. $Mo^{+6}$. Therefore, the concentration of molybdenum in the organic phase was 6.95 g./l. Ten milliliter portions of the 6.95 g./l. containing organic phase were taken at various time intervals after loading, combined with 5 ml. aliquots of a 5% by weight $Na_2CO_3$–2.5% by weight $NH_3$ aqueous solution in a separatory funnel and shaken for two minutes at ambient room temperature. The separated stripping solutions were then analyzed for molybdenum and the percent $Mo^{+6}$ stripped from the loaded organic phase was calculated. Results are set forth in the following Table III:

TABLE III

| Time after loading | $MoZ_6$ aq., g./l. | Percent stripped |
|---|---|---|
| 6 min | 11.02 | 79.1 |
| 60 min | 10.42 | 74.8 |
| 190 min | 8.87 | 63.8 |
| 24 hrs | 10.52 | 75.6 |

The best stripping was thus obtained shortly after the loading step. However, good stripping was also obtained at the various other time intervals at which the aliquots were taken after loading.

It is to be understood that the invention is not to be limited to the exact details of operation or the exact processes shown and described, as obvious modifications and equivalents will be apparent to those skilled in the art and the invention is to be limited only by the scope of the appended claims.

The embodiments of the invention in which an exclusive property or privilege is claimed are defined as follows:

1. A process for the recovery of molybdenum values from an acidic aqueous solution thereof comprising: (1) contacting said aqueous solution with a liquid organic phase comprising a water-immiscible organic solvent and an α-hydroxy oxime to extract at least a portion of the molybdenum values into the organic phase, said oxime having the structural formula:

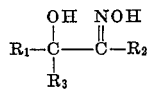

where $R_1$, $R_2$ and $R_3$ are alkyl groups of 1 to about 14 carbon atoms with $R_1$ and $R_3$ being attached to the carbon atom substituted with the hydroxyl group through primary carbon atoms and the oxime being further characterized as having a total carbon atom content of 8 to 44; (2) separating the resultant molybdenum containing organic phase from the aqueous phase; and (3) recovering the molybdenum containing organic phase.

2. The process of claim 1 wherein the α-hydroxy oxime has a total carbon atom content of about 12 to 20.

3. The process of claim 1 wherein one of the alkyl groups $R_1$ and $R_3$ is the same as $R_2$.

4. The process of claim 1 wherein the α-hydroxy oxime is 7-n-butyl-7-hydroxydodecan-6-oxime.

5. The process of claim 1 wherein the α-hydroxy oxime is 6-n-butyl-6-hydroxydodecan-5-oxime.

6. The process of claim 1 wherein the volume phase ratio of the aqueous phase to the organic phase is in the range of about 100:1 to 1:100.

7. The process of claim 1 wherein the water-immiscible organic solvent is a liquid hydrocarbon and the α-hydroxy oxime is used in an amount of about 2 to 50% by weight based on the organic phase.

8. The process of claim 1 wherein the aqueous solution containing molybdenum values is obtained from acid leaching of molybdenum-containing ores.

9. The process of claim 1 wherein the molybdenum values are removed from the molybdenum containing organic phase by (4) contacting said phase with an aqueous basic stripping medium to strip at least a portion of the molybdenum values from the organic phase and (5) separating the organic phase from the molybdenum containing stripping solution.

10. The process of claim 9 wherein the volume phase ratio of the organic phase to the aqueous stripping medium is in the range of about 100:1 to 1:100.

11. The process of claim 9 wherein the separated organic phase is continuously recycled for contacting further quantities of molybdenum values containing solution.

12. The process of claim 9 wherein the molybdenum values in the aqueous solution are derived from $$Na_2MoO_4 \cdot 2H_2O$$

the water-immiscible organic solvent is kerosene, the α-hydroxy oxime is 6-n-butyl-6-hydroxydodecan-5-oxime and is present in the organic phase in an amount of about 2 to 15% by weight, the volume phase ratio of the aqueous phase to the organic phase is in the range of about 10:1 to 1:10, the aqueous stripping medium is an aqueous solution of sodium carbonate and ammonia and the volume phase ratio of the molybdenum containing organic phase to the aqueous stripping phase is in the range of 10:1 to 1:10.

References Cited

UNITED STATES PATENTS

| 2,909,542 | 10/59 | Soloway | 23—22 X |
| 3,088,798 | 5/63 | Fetscher | 75—121 X |
| 3,088,799 | 5/63 | Fetscher | 75—121 X |
| 3,224,873 | 12/65 | Swanson | 75—117 X |
| 3,276,863 | 10/66 | Drobnick et al. | 75—108 |
| 3,284,501 | 11/66 | Swanson | 75—117 X |

HERBERT T. CARTER, *Primary Examiner.*

U.S. Cl. X.R.

23—51, 24; 75—121